(No Model.)
A. BOURKE.
BOTTLE.
No. 588,216. Patented Aug. 17, 1897.
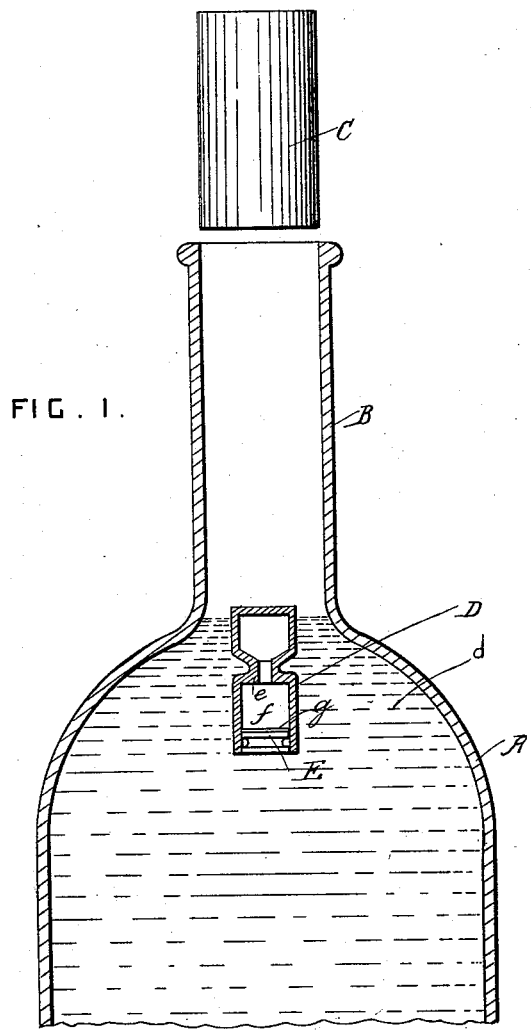
FIG. 1.
FIG. 2.
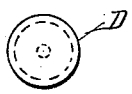
WITNESSES
J. Gregg Poole
Geo. F. Blair
INVENTOR
Alphege Bourke.
By Herbert W. Jenner.
Attorney

UNITED STATES PATENT OFFICE.

ALPHEGE BOURKE, OF VALPARAISO, INDIANA, ASSIGNOR OF TWO-THIRDS TO AUGUST J. SEIFERT AND FREDERICK J. WILKEN, OF SAME PLACE.

BOTTLE.

SPECIFICATION forming part of Letters Patent No. 588,216, dated August 17, 1897.

Application filed February 1, 1897. Serial No. 621,536. (No model.)

*To all whom it may concern:*

Be it known that I, ALPHEGE BOURKE, a citizen of the United States, residing at Valparaiso, in the county of Porter and State of Indiana, have invented certain new and useful Improvements in Bottles; and I do hereby declare the following to be a full, clear, and exact description of the invention, such as will enable others skilled in the art to which it appertains to make and use the same.

This invention relates to bottles; and it consists in the novel construction and combination of the parts hereinafter fully described and claimed, whereby an indication is given when the original contents of the bottle have been removed by drilling the bottle.

In the drawings, Figure 1 is a longitudinal section of the upper part of a bottle provided with a float according to this invention. Fig. 2 is a plan view of the float.

A is the upper part of a bottle provided with a neck B, which is preferably substantially cylindrical in form.

C is a cork or stopper which is slid under pressure into the neck B.

D is a float, and $d$ is the original liquid with which the bottle is filled up to the bottom of the neck. The float is dropped into the liquid and is so proportioned and adjusted that it will just float at the surface of the liquid at ordinary atmospheric pressure and will sink to the bottom of the bottle when the pressure inside the bottle exceeds that of the atmosphere.

The bottle is closed by forcing the cork or stopper into the neck after the manner of a piston, so that a pressure sufficiently above that of the atmosphere is formed in the bottle to cause the float to sink.

The elasticity of the cork holds it fast in the neck of the bottle, so that the float remains permanently at the bottom of the bottle until the cork is extracted or until the pressure in the bottle is otherwise reduced to that of the atmosphere.

If the original contents are removed by drilling a hole in the bottle, the bottle can be filled with spurious liquid, but the float will swim at the surface of the spurious liquid, because it is not possible to first produce a pressure inside the bottle, so that the float may sink, and then plug the hole through which the original contents have been abstracted, so that a pressure shall still remain in the bottle.

The float may be made in various ways in carrying out this invention. The float D is formed of a hollow vessel closed at the top and provided with a shoulder $e$ at its lower part and a cylinder $f$ below the said shoulder.

E is a piston which is slidable in the cylinder $f$, and $g$ is a packing-washer between the piston E and the shoulder.

The upper part of the float contains air which is compressed by the piston, which slides upward when the contents of the bottle are subjected to pressure by forcing the cork into the neck of the bottle. The piston prevents the air inside the float from being absorbed by the liquid in the bottle.

What I claim is—

1. The combination, with a bottle, of a hollow float which at atmospheric pressure will swim at the surface of the liquid in the bottle, and a cork for closing the bottle, said float being provided with an opening and a piston closing the opening and preventing liquid from entering its air-space and permanently confining the air in it at a pressure above that of the atmosphere, thereby keeping the float at the bottom of the bottle until the bottle is opened and the pressure of the air in it is reduced to that of the atmosphere, substantially as set forth.

2. The combination, with a bottle provided with means for confining its contents under a prearranged pressure, of a float comprising a hollow vessel open at its bottom and provided with a cylinder at its lower part, and a piston slidable in the said cylinder and preventing liquid from entering the air-space of the float, substantially as set forth.

In testimony whereof I affix my signature in presence of two witnesses.

ALPHEGE BOURKE.

Witnesses:
AARON L. JONES,
FRANK B. PARKS.